US009355527B2

(12) United States Patent
Amaitis et al.

(10) Patent No.: US 9,355,527 B2
(45) **Date of Patent: *May 31, 2016**

(54) AMUSEMENT DEVICES AND CHANCE DEVICES BASED ON FINANCIAL MARKET INDICATORS

(75) Inventors: Lee M. Amaitis, London (GB); Joseph M. Asher, New York, NY (US)

(73) Assignee: CFPH, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,369

(22) Filed: Sep. 13, 2012

(65) Prior Publication Data

US 2013/0012296 A1 Jan. 10, 2013

Related U.S. Application Data

(60) Continuation of application No. 12/603,162, filed on Oct. 21, 2009, now Pat. No. 8,968,078, which is a continuation of application No. 11/841,049, filed on Aug. 20, 2007, now Pat. No. 7,604,537, which is a division of application No. 10/836,077, filed on Apr. 29, 2004.

(51) Int. Cl.

| | |
|---|---|
| ***G06F 17/00*** | (2006.01) |
| ***G06F 19/00*** | (2011.01) |
| ***G07F 17/34*** | (2006.01) |
| *G07F 17/32* | (2006.01) |

(52) U.S. Cl.
CPC ............ *G07F 17/34* (2013.01); *G07F 17/3288* (2013.01); *G07F 17/3244* (2013.01)

(58) Field of Classification Search
CPC ......................... G07F 17/3244; G07F 17/3288
USPC ................................................ 463/16–20, 22
See application file for complete search history.

(56) References Cited

U.S. PATENT DOCUMENTS

| | | | | |
|---|---|---|---|---|
| 4,248,458 A | | 2/1981 | Brody | |
| 4,540,174 A | | 9/1985 | Coppock | |
| 4,569,526 A | | 2/1986 | Hamilton | |
| 4,666,160 A | | 5/1987 | Hamilton | |
| 4,695,053 A | | 9/1987 | Vazquez, Jr. et al. | |
| 4,817,951 A | * | 4/1989 | Crouch et al. | 463/20 |
| 4,856,788 A | | 8/1989 | Fischel | |
| 4,874,177 A | | 10/1989 | Girardin | |
| 4,883,636 A | | 11/1989 | Fantle, Jr. | |
| 4,935,748 A | | 6/1990 | Schmidt et al. | |

(Continued)

FOREIGN PATENT DOCUMENTS

| | | |
|---|---|---|
| EP | 1 139245 | 10/2001 |
| EP | 1 234606 | 8/2002 |

(Continued)

OTHER PUBLICATIONS

Random Walk Theory; http://www.streetauthority.com/tenns/r/random-walk-theory.asp; 3 pages; date unknown.

(Continued)

*Primary Examiner* — Steven J Hylinski
(74) *Attorney, Agent, or Firm* — Mark Miller

(57) ABSTRACT

A method for wagering comprises receiving a bet regarding a spin of the reels of a slot machine. An outcome may be determined based on one or more financial market indicators. Other embodiments are disclosed.

18 Claims, 2 Drawing Sheets

(56) References Cited

U.S. PATENT DOCUMENTS 4,962,950 A 10/1990 Champion
5,518,239 A 5/1996 Johnston
5,524,888 A 6/1996 Heidel
5,586,937 A 12/1996 Menashe
5,683,090 A 11/1997 Zeile et al.
5,709,603 A 1/1998 Kaye
5,713,793 A 2/1998 Holte
5,722,890 A 3/1998 Libby et al.
5,743,525 A 4/1998 Haddad
5,749,785 A 5/1998 Rossides
5,782,470 A 7/1998 Langan
5,851,010 A 12/1998 Feinberg
5,888,136 A 3/1999 Herbert
6,001,016 A 12/1999 Walker et al.
6,024,641 A * 2/2000 Sarno .............................. 463/17
6,026,383 A 2/2000 Ausubel
6,038,554 A 3/2000 Vig
6,062,979 A 5/2000 Inoue
6,098,051 A 8/2000 Lupien et al.
6,102,797 A 8/2000 Kail
6,110,042 A 8/2000 Walker et al.
6,113,492 A 9/2000 Walker et al.
6,120,376 A 9/2000 Cherry
6,126,543 A 10/2000 Friedman
6,135,881 A 10/2000 Abbott et al.
6,152,822 A 11/2000 Herbert
6,157,918 A 12/2000 Shepherd
6,193,605 B1 2/2001 Libby et al.
6,296,569 B1 10/2001 Congello, Jr.
6,309,307 B1 * 10/2001 Krause et al. ................. 473/274
6,321,212 B1 11/2001 Lange
6,325,721 B1 12/2001 Miyamoto et al.
6,331,148 B1 12/2001 Krause et al.
6,343,988 B1 2/2002 Walker et al.
6,358,150 B1 3/2002 Mir et al.
6,394,899 B1 5/2002 Walker
6,421,653 B1 7/2002 May
6,450,887 B1 9/2002 Mir et al.
6,527,270 B2 3/2003 Maksymec et al.
6,547,242 B1 4/2003 Sugiyama et al.
6,558,255 B2 5/2003 Walker et al.
6,616,529 B1 9/2003 Qian et al.
6,624,641 B1 * 9/2003 Krampitz et al. ............. 324/691
6,656,042 B2 12/2003 Reiss et al.
6,663,107 B2 12/2003 Fisher et al.
6,666,769 B2 12/2003 Stronach
6,688,978 B1 2/2004 Herman
6,709,330 B1 3/2004 Klein et al.
6,869,360 B2 * 3/2005 Marks et al. .................... 463/25
6,910,965 B2 6/2005 Downes
7,040,982 B1 5/2006 Jarvis et al.
7,094,151 B2 8/2006 Downes
7,155,409 B1 12/2006 Stroh et al.
7,160,189 B2 1/2007 Walker et al.
7,206,762 B2 4/2007 Sireau
7,233,922 B2 6/2007 Asher et al.
7,302,412 B1 11/2007 Speck
7,458,891 B2 12/2008 Asher et al.
7,566,268 B2 7/2009 Asher et al.
7,566,270 B2 7/2009 Amaitis et al.
7,604,537 B2 10/2009 Amaitis et al.
7,637,807 B2 12/2009 Asher et al.
7,693,781 B2 4/2010 Asher et al.
7,708,636 B2 5/2010 Asher et al.
7,711,628 B2 5/2010 Davie et al.
7,789,754 B2 9/2010 Asher et al.
7,835,961 B2 11/2010 Davie et al.
7,962,400 B2 6/2011 Amaitis et al.
8,460,085 B2 6/2013 Alderucci et al.
8,535,140 B2 9/2013 Alderucci et al.
2001/0032169 A1 10/2001 Sireau
2001/0039209 A1 11/2001 DeWeese et al.
2002/0032644 A1 3/2002 Corby et al.
2002/0073021 A1 6/2002 Ginsberg et al.
2002/0087447 A1 7/2002 McDonald et al.
2002/0115488 A1 8/2002 Berry et al.
2002/0142820 A1 10/2002 Bartlett
2002/0147047 A1 10/2002 Letovsky et al.
2002/0151340 A1 10/2002 Guinn et al.
2002/0151363 A1 10/2002 Letovsky et al.
2002/0198044 A1 12/2002 Walker et al.
2002/0198052 A1 12/2002 Soltys et al.
2003/0046218 A1 3/2003 Albanese et al.
2003/0054875 A1 3/2003 Marks et al.
2003/0109300 A1 6/2003 Walker et al.
2003/0157976 A1 8/2003 Simon et al.
2003/0178775 A1 9/2003 Fisher et al.
2003/0182214 A1 9/2003 Taylor et al.
2003/0182224 A1 9/2003 Horrigan et al.
2003/0190941 A1 10/2003 Byrne
2003/0195029 A1 10/2003 Frohm et al.
2003/0195841 A1 10/2003 Ginsberg et al.
2003/0199315 A1 10/2003 Downes
2003/0216170 A1 11/2003 Walker et al.
2003/0220134 A1 11/2003 Walker et al.
2003/0224847 A1 12/2003 Jaimet
2004/0029627 A1 2/2004 Hannan et al.
2004/0048656 A1 3/2004 Krynicky
2004/0059666 A1 3/2004 Waelbroeck et al.
2004/0102242 A1 5/2004 Poelmann
2004/0111358 A1 6/2004 Lange et al.
2004/0127281 A1 7/2004 Fong
2004/0133495 A1 7/2004 Bosch
2004/0166918 A1 8/2004 Walker et al.
2004/0166942 A1 * 8/2004 Muir ............................... 463/43
2004/0176159 A1 9/2004 Walker et al.
2004/0176994 A1 9/2004 Fine et al.
2004/0177023 A1 9/2004 Krowas et al.
2004/0204229 A1 10/2004 Walker et al.
2004/0204232 A1 10/2004 Asher et al.
2004/0210507 A1 10/2004 Asher et al.
2004/0210511 A1 10/2004 Waelbroeck et al.
2004/0214629 A1 10/2004 Walker et al.
2004/0224770 A1 * 11/2004 Wolf et al. ...................... 463/42
2004/0235542 A1 * 11/2004 Stronach et al. .................. 463/6
2005/0026670 A1 2/2005 Lardie
2005/0027643 A1 2/2005 Amaitis et al.
2005/0043078 A1 2/2005 Sundstrom
2005/0049038 A1 3/2005 Cuddy et al.
2005/0059467 A1 3/2005 Saffari et al.
2005/0075963 A1 4/2005 Balabon
2005/0085288 A1 4/2005 Schugar et al.
2005/0091142 A1 4/2005 Renton et al.
2005/0119962 A1 6/2005 Bowen et al.
2005/0171891 A1 8/2005 Daley et al.
2005/0197938 A1 9/2005 Davie et al.
2005/0197939 A1 9/2005 Davie et al.
2005/0197948 A1 9/2005 Davie et al.
2005/0208996 A1 9/2005 Friedman
2005/0245308 A1 * 11/2005 Amaitis et al. .................. 463/20
2005/0245310 A1 * 11/2005 Amaitis et al. .................. 463/20
2006/0026090 A1 2/2006 Balabon
2006/0031157 A1 2/2006 Gianakouros et al.
2006/0105839 A1 5/2006 Graeve et al.
2006/0105840 A1 5/2006 Graeve
2006/0199631 A1 9/2006 McGill et al.
2007/0055607 A1 3/2007 Wunsch et al.
2007/0111777 A1 5/2007 Amaitis et al.
2007/0117624 A1 5/2007 Amaitis et al.
2007/0123336 A1 5/2007 Amaitis et al.
2007/0129138 A1 6/2007 Amaitis et al.
2007/0184892 A1 8/2007 Asher et al.
2007/0207849 A1 9/2007 Asher et al.
2007/0208642 A1 9/2007 Asher et al.
2007/0288342 A1 12/2007 Maclin et al.
2008/0004116 A1 1/2008 Van Luchene et al.
2008/0021803 A1 1/2008 Ahles et al.
2008/0032778 A1 2/2008 Amaitis et al.
2008/0064499 A1 3/2008 Grant
2008/0214274 A1 9/2008 Thomas et al.
2009/0163265 A1 6/2009 Amaitis et al.
2009/0163266 A1 6/2009 Amaitis et al.

(56) References Cited

U.S. PATENT DOCUMENTS

| | | | |
|---|---|---|---|
| 2009/0221357 | A1 | 9/2009 | Amaitis et al. |
| 2010/0041463 | A1 | 2/2010 | Amaitis et al. |
| 2014/0302910 | A1 | 10/2014 | Amaitis et al. |

FOREIGN PATENT DOCUMENTS

| | | |
|---|---|---|
| GB | 1574447 | 9/1980 |
| GB | 2180675 | 4/1987 |
| GB | 2299425 | 10/1996 |
| JP | 4-97765 | 3/1992 |
| JP | 2001-523869 | 11/2001 |
| JP | 2002-041809 | 2/2002 |
| JP | 2002-159624 | 6/2002 |
| JP | 2002-329115 | 11/2002 |
| JP | 2006-509308 | 3/2006 |
| JP | 2007-510225 | 4/2007 |
| WO | WO 98/04991 | 2/1998 |
| WO | WO 99/26204 | 5/1999 |
| WO | WO 99/60498 | 11/1999 |
| WO | WO 00/79442 | 12/2000 |
| WO | WO 01/50831 | 7/2001 |
| WO | WO 01/77964 A2 | 10/2001 |
| WO | WO 01/86532 | 11/2001 |
| WO | WO 2004/057440 | 7/2004 |
| WO | WO 2004/079671 A2 | 9/2004 |
| WO | WO 2005/045613 | 5/2005 |
| WO | WO 2005/065065 A2 | 7/2005 |

OTHER PUBLICATIONS

Welcome to binarybet.com; binarybet.com; 1 page; Date: 2003.
What is a Binary Bet?; binarybet.com; 1 page; Date: 2003.
Frequently Asked Questions; binarybet.com; 1 page; Date: 2003.
USPTO Office Action for U.S. Appl. No. 10/654,280 Apr. 7, 2005 (9 pages).
Fixed Odds Financial Betting; http://web.archive.org/web/20020329110541/http://betonmarkets.corn/; 2 pages; May 10, 2005.
Notification of Transmittal of the International Search Report and the Written Opinion of the International Searching Authority for International Application No. PCT/US2005/006853; 13 pages, May 10, 2005.
USPTO Office Action for U.S. Appl. No. 10/836,077, Jun. 28, 2007 (5 pages).
USPTO Office Action for U.S. Appl. No. 10/794,666, Sep. 27, 2007 (6 pages).
USPTO Office Action for U.S. Appl. No. 11/536,094, Oct. 25, 2007 (24 pages).
USPTO Office Action for U.S. Appl. No. 11/535,662, Nov. 1, 2007 (12 pages).
USPTO Office Action for U.S. Appl. No. 10/795,163, Mar. 13, 2008 (11 pages).
USPTO Office Action for U.S. Appl. No. 11/745,573, Apr. 10, 2008 (8 pages).
Australian Examiner's Report for Application 2004227808; 2 pages; Date: May 16, 2008.
USPTO Office Action for U.S. Appl. No. 10/794,666, May 28, 2008 (11 pages).
Notification of Transmittal of the International Search Report and the Written Opinion of the International Searching Authority for International Application No. PCT/US05/15129; 8 pages; Date: May 28, 2008.
USPTO Advisory Action for U.S. Appl. No. 10/836,077, Jun. 3, 2008 (2 pages).
USPTO Advisory Action for U.S. Appl. No. 11/018,978, Jul. 12, 2007 (3 pages).
USPTO Office Action for U.S. Appl. No. 11/018,978, May 14, 2008 (6 pages).
"NTRA All Star Jockey Championship Special Wagers," 3 pages, Date: At latest Apr. 29, 2004.
Wagering Information: Straight or Basic Wagers; Lone Star Park at Grand Prairie: Player's Guide; http://www.lonestarpark.com/bet info.asp; 3 pages; Date Unknown.
Wagering Information: Straight or Basic Wagers; NTRA.com, http://www.ntra.com/news.asp?type=playthehorses&id=4799; 3 pages; Date Unknown.
Glossary of Terms; NTRA.com; http://www.ntra.com/news.asp?type=playthehorses&id=4797; 4 pages; Date Unknown.
The Basics of Horseplay; NTRA.com; http://www.ntra.com/news.asp?type=playthehorses&id=4795; 2 pages; Date Unknown.
Ozgit, A.; Performance Based Sports Derivatives: A New Instrument; Chapter 3; pp. 83-121. Date Unknown.
Sauer, Raymond D.; The Economics of Wagering Markets; Journal of Economic Literature; vol. 36, No. 4; pp. 2021-2064; Date: Dec. 1998.
Bet with the People Who Know Racing; Racing Daily Forum; 15 pages; Date: Jul. 24, 2001.
Quote of the Day; Bet of the Day; London Times; 1 page; Date: Jul. 30, 2003.
The Patent Office Search Report for International Application No. GB 0320232.2; 6 pages; Date:Dec. 17, 2003.
TradeSports Trading & Betting Exchange, Best Lines & Bonuses, What is Tradesports?; www.tradesports.com; 2 pages; Date: Apr. 27, 2004.
Savage, Sam L.: Prices, Probabilities and Predictions; ORIMS Today; 10 pages; Date: Jun. 2004.
USPTO Office Action for U.S. Appl. No. 10/654,280, Jul. 13, 2005 (17 pages).
USPTO Office Action for U.S. Appl. No. 10/654,280, Jan. 12, 2006 (11 pages).
Notification of Transmittal of the International Search Report and the Written Opinion of the International Searching Authority for International Application No. PCT/US05/46927; 9 pages; Date: Jun. 19, 2006.
Notification of Transmittal of the International Search Report and the Written Opinion of the International Searching Authority for International Application No. PCT/US04/10028; 6 pages; Date: Jun. 23, 2006.
USPTO Notice of Allowance and Fee(s) Due for U.S. Appl. No. 10/654,280, Jan. 25, 2007 (9 pages).
Notification of Transmittal of the International Search Report and the Written Opinion of the International Searching Authority for International Application No. PCT/US05/15001; 10 pages; Date: Sep. 13, 2007.
USPTO Office Action for U.S. Appl. No. 10/836,077, Aug. 22, 2007 (17 pages).
USPTO Office Action for U.S. Appl. No. 10/836,077, Mar. 14, 2008 (11 pages).
USPTO Office Action for U.S. Appl. No. 11/018,978, May 18, 2006 (14 pages).
USPTO Office Action for U.S. Appl. No. 11/018,978, Apr. 25, 2007 (15 pages).
USPTO Office Action for U.S. Appl. No. 11/018,978, Aug. 17, 2007 (12 pages).
USPTO Office Action for U.S. Appl. No. 10/836,077, Oct. 28, 2008 (11 pages).
USPTO Office Action for U.S. Appl. No. 11/841,049, Nov. 26, 2008 (7 pages).
USPTO Office Action for U.S. Appl. No. 10/836,975, Aug. 31, 2007 (26 pages).
USPTO Office Action for U.S. Appl. No. 11/623,901, Mar. 12, 2008 (14 pages).
USPTO Office Action for U.S. Appl. No. 11/623,908, Feb. 4, 2008 (14 pages).
USPTO Office Action for U.S. Appl. No. 11/623,933, Apr. 29, 2008 (9 pages).
USPTO Office Action for U.S. Appl. No. 11/623,943, Mar. 17, 2008 (16 pages).
USPTO Office Action for U.S. Appl. No. 10/836,975, Feb. 9, 2007 (29 pages).
Marshall Fey, "Slot Machines, A Pictorial History of the First 100 Years", Fifth Edition, Liberty Belle Books, 1983, pp. 59-60 & 168.
Notification of Transmittal of the International Search Report and the Written Opinion of the International Searching Authority, or the Declaration for International Application No. PCT/US05/14667; 11 pages; Date: Mar. 30, 2007.

(56) References Cited

OTHER PUBLICATIONS

Notification of Transmittal of the International Search Report and Written Opinion for International Application No. PCT/US05/15004, 6 pages; Date: Jun. 14, 2006.
USPTO Office Action for U.S. Appl. No. 10/836,958, Mar. 7, 2008 (16 pages).
USPTO Office Action for U.S. Appl. No. 11/623,901, Dec. 24, 2008 (14 pages).
USPTO Office Action for U.S. Appl. No. 11/623,943, Jan. 6, 2009 (27 pages).
USPTO Office Action for U.S. Appl. No. 10/836,975, Nov. 20, 2008 (25 pages).
Notice of Allowance for U.S. Appl. No. 10/836,958; Oct. 6, 2008 (6 pages).
USPTO Notice of Allowance for U.S. Appl. No. 11/623,933, May 18, 2009 (27 pages).
USPTO Notice of Allowance for U.S. Appl. No. 11/018,978, May 26, 2009 (7 pages).
USPTO Notice of Allowance for U.S. Appl. No. 10/836,975, Jul. 1, 2009 (18 pages).
USPTO Office Action for U.S. Appl. No. 10/836,077, Jul. 31, 2009 (15 pages).
Random House Unabridged Dictionary, Copyright 1997, Random House Inc. on Infoplease, <http://dictionary.infoplease.com/formula>.
USPTO Notice of Allowance for U.S. Appl. No. 11/841,049, Sep. 8, 2009 (7 pages).
USPTO Examiner Interview Summary Record for U.S. Appl. No. 10/836,077, Oct. 13, 2009 (3 pages).
USPTO Notice of Allowance for U.S. Appl. No. 11/623,901; 28 pages; Dec. 18, 2009.
USPTO Notice of Allowance for U.S. Appl. No. 11/623,908; 27 pages; Dec. 18, 2009.
EPO Communication dated Jan. 15, 2010 forwarding Supplementary European Search Report for Application No. EP 05741231.4, dated Dec. 22, 2009 (2 pages).
USPTO Pre-Brief Appeal Conference Decision for U.S. Appl. No. 10/836,077, Feb. 12, 2010 (2 pages).
USPTO Examiner Interview Summary for U.S. Appl. No. 10/836,975, Jun. 5, 2009 (2 pages).
USPTO Pre-Brief Appeal Conference Decision for U.S. Appl. No. 10/836,975, Jun. 12, 2009 (2 pages).
USPTO Response to Amendment under Rule 312 for U.S. Appl. No. 10/836,975, Sep. 4, 2009 (2 pages).
USPTO Pre-Brief Appeal Conference Decision for U.S. Appl. No. 11/623,901, Jun. 30, 2009 (2 pages).
USPTO Pre-Brief Appeal Conference Decision for U.S. Appl. No. 11/623,943, Sep. 14, 2009 (2 pages).
USPTO Notice of Allowance and Fees Due for U.S. Appl. No. 11/623,901, Apr. 8, 2010 (6 pages).
EPO Communication dated Jan. 27, 2010 forwarding Supplementary European Search Report for Application No. EP 05744471.3, dated Jan. 15, 2010 (3 pages).
Australian Examiner's Report for Application No. 2005240605, dated Jun. 8, 2010 (2 pages).
EPO Communication and Exam Report for Application No. 05741231.4, dated Aug. 13, 2010 (5 pages).
Japanese Office Action with English translation for Application No. 2007-510986, mailed May 25, 2010 (9 pages).
Japanese Office Action with English translation for Application No. 2007-511082, dated Jul. 13, 2010 (21 pages).
Japanese Office Action with English translation for Application No. 2007-548561, dated Sep. 7, 2010 (11 pages).
European Communication and extended European Search Report for Application No. 05855479.1, dated Sep. 24, 2010 (6 pages).
Australian Exam Report for Application No. 2005319039, dated Jul. 28, 2010 (2 pages).
USPTO Examiner's Answer to Appeal Brief for U.S. Appl. No. 10/836,077, Aug. 27, 2010 (31 pages).
AU Examination Report for Application No. 2005240588, dated Jun. 4, 2010 (2 pages).
EP Office Action for Application No. 05740565.4, dated Jun. 9, 2010 (4 pages).
Japanese Office Action with English translation for Application No. 2007-511050, dated May 25, 2010 (9 pages).
EP Office Action for Application No. 05744471.3 dated Jun. 16, 2010 (5 pages).
AU Examination Report for Application No. 2005241445, dated Jun. 8, 2010 (2 pages).
USPTO Office Action for U.S. Appl. No. 12/032,141, Jan. 21, 2011 (11 pages).
Japanese Office Action with English translation for Application No. 2007-511082, dated Jan. 18, 2011 (4 pages).
USPTO Office Action for U.S. Appl. No. 12/032,160, Feb. 3, 2011 (10 pages).
USPTO Office Action for U.S. Appl. No. 12/603,162, May 5, 2011 (11 pages).
Australian Notice of Acceptance for Application No. 2005240605, dated Jun. 22, 2011 (3 pages).
Japanese Office Action with English translation for Application No. 2007-510986, dated Apr. 12, 2011 (5 pages).
USPTO Office Action for U.S. Appl. No. 12/032,141, Jul. 27, 2011 (11 pages).
USPTO Office Action for U.S. Appl. No. 12/032,160, Jul. 27, 2011 (9 pages).
Japanese Official Questioning with English translation for Application No. 2007-511082, dated Aug. 9, 2011 (8 pages).
USPTO Office Action for U.S. Appl. No. 12/463,549, Dec. 29, 2011 (12 pages).
USPTO Office Action for U.S. Appl. No. 11/963,088, Nov. 25, 2011 (7 pages).
USPTO Office Action for U.S. Appl. No. 11/963,158, Oct. 3, 2011 (7 pages).
USPTO Office Action for U.S. Appl. No. 12/874,661, Nov. 22, 2011 (14 pages).
USPTO Office Action for U.S. Appl. No. 12/032,141, Feb. 6, 2012 (2 pages).
USPTO Office Action for U.S. Appl. No. 12/032,160, Feb. 6, 2012 (3 pages).
USPTO Office Action for U.S. Appl. No. 12/603,162, Apr. 13, 2012 (14 pages).
EPO Decision to Refuse for Application No. 05741231.4, dated Jan. 18, 2012 (4 pages).
Australian Notice of Acceptance for Application No. 2005319039, dated May 1, 2012 (3 pages).
Australian Exam Report for Application No. 2011232768, dated May 21, 2012 (2 pages).
Australian Exam Report for Application No. 2005241445, dated Mar. 7, 2012 (2 pages).
Canadian Exam Report for Application No. 2,564,301, dated Oct. 19, 2012 (3 pages).
US Office Action for U.S. Appl. No. 12/032,141; Jun. 13, 2012; 11 pages.
USPTO Office Action for U.S. Appl. No. 12/032,160, Jun. 13, 2012 (11 pages).
Australian Exam Report for Application No. 2012202392; Nov. 16, 2012 (3 pages).
EP Communication Pursuant to Article 94(3) EPC for Application No. 05855479.1; Oct. 17, 2012 (6 pages).
JP Office Action for Application No. 2011-111339; Sep. 4, 2012; 7 pages.
JP Office Action for Application No. 2011-10393; Nov. 20, 2012; 4 pages.
JP Office Action for Application No. 2011-10393; May 8, 2012; 4 pages.
US Office Action for U.S. Appl. No. 11/963,088; Aug. 20, 2012; 11 pages.
US Office Action for U.S. Appl. No. 11/963,158; Jun. 26, 2012; 13 pages.
JP Office Action for Application No. 2007-510986; Aug. 28, 2012; 5 pages.

(56) References Cited

OTHER PUBLICATIONS

US Office Action for U.S. Appl. No. 12/874,661; Sep. 27, 2012; 14 pages.
US Office Action for U.S. Appl. No. 12/631,208; Oct. 27, 2011; 15 pages.
US Office Action for U.S. Appl. No. 12/631,208; Sep. 25, 2012; 15 pages.
PCT International Search Report and Written Opinion for Application No. PCT/US2010/021986; Mar. 8, 2010; 8 pages.
"Hardware Random Number Generator", Wikipedia.org, Apr. 8, 2013; http://en.wikipedia.org/wiki/Hardware_random_number_generator.
USPTO Pre-Brief Appeal Conference Decision for U.S. Appl. No. 12/032,141, Mar. 26, 2013 (2 pages).
USPTO Notice of Allowance for U.S. Appl. No. 12/032,141, Apr. 10, 2013 (13 pages).
USPTO Pre-Brief Appeal Conference Decision for U.S. Appl. No. 12/032,160, Mar. 25, 2013 (2 pages).
USPTO Notice of Allowance and Fees due for for U.S. Appl. No. 12/032,160, Apr. 25, 2013 (15 pages).
USPTO Office Action for U.S. Appl. No. 12/603,162, Jul. 11, 2012 (2 pages).
USPTO Pre-Brief Appeal Conference Decision for U.S. Appl. No. 12/603,162, Jan. 31, 2013 (3 pages).
USPTO Office Action for U.S. Appl. No. 13/613,369, May 31, 2013 (10 pages).
USPTO Office Action for U.S. Appl. No. 12/463,549, May 10, 2013 (16 pages).
Canadian Exam Report for Application No. 2,564,462, dated Sep. 14, 2012 (3 pages).
Canadian Exam Report for Application No. 2,591,990, dated Feb. 1, 2013 (3 pages).
USPTO Pre-Brief Appeal Conference Decision for U.S. Appl. No. 11/963,088, Jun. 14, 2013 (2 pages).
USPTO Office Action for U.S. Appl. No. 11/963,088, Jun. 21, 2013 (12 pages).
USPTO Office Action for U.S. Appl. No. 11/963,158, Jun. 26, 2012 (13 pages).
USPTO Pre-Brief Appeal Conference Decision for U.S. Appl. No. 11/963,158, Apr. 24, 2013 (2 pages).
USPTO Office Action for U.S. Appl. No. 14/027,333, Oct. 24, 2013 (9 pages).
Japanese Office Action with English translation for Application No. 2011-111339, dated Jun. 4, 2013 (4 pages).
USPTO Notice of Allowance and Fees Due for U.S. Appl. No. 13/613,391; Sep. 17, 2013 (9 pages).
Canadian Exam Report for Application No. 2,564,455, dated Aug. 9, 2013 (3 pages).
Japanese Office Action with English translation for Application No. 2007-511050, dated Apr. 12, 2011 (6 pages).
USPTO Office Action for U.S. Appl. No. 12/874,661, Jun. 24, 2013 (12 pages).
USPTO Office Action for U.S. Appl. No. 13/615,501, Nov. 25, 2013 (14 pages).
USPTO Pre-Brief Appeal Conference Decision for U.S. Appl. No. 12/463,549, Dec. 20, 2013 (2 pages).
USPTO Notice of Allowance and Fees Due for U.S. Appl. No. 13/613,391; Feb. 4, 2014 (7 pages).
Canadian Exam Report for Application No. 2,564,301, dated Dec. 23, 2013 (3 pages).
Australian Notice of Acceptance for Application No. 2011232768 dated Feb. 25, 2014, 2 pages.
Canadian Exam Report for Application No. 2,564,462, dated Feb. 28, 2014 (3 pages).
Japanese Office Action with English translation for Application No. 2011-111339 dated Mar. 11, 2014 (6 pages).
USPTO Decision on Appeal for U.S. Appl. No. 10/836,077, Mar. 3, 2014 (6 pages).
USPTO Office Action for U.S. Appl. No. 12/603,162, Feb. 24, 2014 (10 pages).
USPTO Office Action for U.S. Appl. No. 11/963,088, Apr. 24, 2014 (11 pages).
USPTO Notice of Allowance and Fees Due for U.S. Appl. No. 11/963,158, Feb. 19, 2014 (7 pages).
Australian Exam Report for Application No. 2012201350 dated Feb. 21, 2014 (3 pages).
Japanese Office Action with English translation for Application No. 2012-285715 dated Mar. 4, 2014 (4 pages).
USPTO Office Action for U.S. Appl. No. 12/874,661, Apr. 24, 2014 (12 pages).
USPTO Office Action for U.S. Appl. No. 14/027,333, Jun. 11, 2014 (5 pages).
USPTO Notice of Allowance and Fees Due for U.S. Appl. No. 10/836,077, May 20, 2014 (15 pages).
USPTO Office Action for U.S. Appl. No. 13/913,848, Jun. 26, 2014 (12 pages).
Canadian Exam Report for App. No. 2,591,990, dated Aug. 4, 2014 (3 pages).
Australian Exam Report for App. No. 2010206571, dated Sep. 4, 2014 (3 pages).
European Communication and Decision to Refuse for Application No. 05855479.1, dated Feb. 18, 2014 (8 pages).
Canadian Exam Report for Application No. 2,564,462, dated Apr. 2, 2015 (4 pages).
Japanese Office Action with English translation for Application No. 2013-251131 dated May 12, 2015, 4 pages.
Canadian Exam Report for Application No. 2,564,455, dated Mar. 3, 2015 (4 pages).
Canadian Exam Report for Application No. 2,564,301, dated Dec. 9, 2014 (7 pages).
Japanese Office Action with English translation for Application No. 2011-548191 dated Jan. 6, 2015, 6 pages.
Australian Exam Report for App. No. 2014213547, dated Aug. 3, 2015 (3 pages).

* cited by examiner

AMUSEMENT DEVICES AND CHANCE DEVICES BASED ON FINANCIAL MARKET INDICATORS

This application is a continuation of U.S. patent application Ser. No. 12/603,162 filed Oct. 21, 2009, now U.S. Pat. No. 8,968,078 which is a continuation of U.S. patent application Ser. No. 11/841,049 filed Aug. 20, 2007 (now U.S. Pat. No. 7,604,537 issued on Oct. 20, 2009) which is a divisional of U.S. patent application Ser. No. 10/836,077, filed Apr. 29, 2004, the contents of which are incorporated by reference herein.

TECHNICAL FIELD OF THE INVENTION

This invention relates in general to gaming systems and methods and, more particularly, to systems and methods for wagering based on financial market indicators.

BACKGROUND OF THE INVENTION

The rules to playing slot machines are quite simple. A player deposits money and spins the reels. In a physical casino, the player spins the reels by either pushing a button or yanking on a lever. In an online casino, the player uses a mouse or any suitable computer key to click on the button or lever. A slot machine has one or more horizontal lines, or paylines, across the window of the slot machine. If a certain combination of symbols falls on a horizontal line when the reels stop, the player is a winner. Payouts vary by machine, and by the number of lines the player chooses to play.

In prior slot machines, the combination of symbols that line up on the reels of a slot machine are determined by a Random Number Generator. This is a computer program inside the machine that is used to generate a sequence of numbers in milliseconds. Each random number it generates corresponds to a reel combination. Even when a slot machine is not being used, the RNG keeps doing its job of generating numbers. Whatever random number was generated the split second the player pulled the handle (or hit the "bet one" or "max bet" button) will result in the corresponding reel combinations that appear on the screen. The RNG doesn't care how much was bet, whether the player pulled the handle or hit the spin button, whether it's the player's first play or last, whether the player is winning or losing, or whether the player is playing with or without a slot card. It just continually generates random numbers. If the player happens to be the lucky player that plays the very split second the RNG generated a number corresponding to a jackpot reel combination, the player will be a winner.

SUMMARY OF THE INVENTION

In one embodiment, a wagering system is provided. The wagering system comprises a client coupled to a controller. The client communicates a bet regarding a spin of the reels of a slot machine. The controller determines a first value for a first reel of the slot machine based at least in part upon the value of a digit of a first financial market indicator. The controller continues to determine a second value for a second reel of the slot machine, and a third value for a third reel of the slot machine. The controller then determines the outcome of the bet based at least in part upon the first value, the second value, and the third value.

In another embodiment, a method for wagering is provided. The method starts by receiving a bet indicating the value of a multi-digit number. The method continues by determining a first value based at least in part upon the value of a digit of a first financial market indicator, and by determining a second value based at least in part upon the value of a digit of a second financial market indicator. The method proceeds by determining a winning number based at least in part upon the first value and the second value. The method concludes by comparing the winning number against the value of the multi-digit number indicated by the bet, and by determining an outcome of the bet based at least in part upon the comparison.

Various embodiments of the present invention may benefit from numerous advantages. It should be noted that one or more embodiments may benefit from some, none, or all of the advantages discussed below. One advantage is that systems and methods provide bettors with gaming based upon the value of financial market indicators. Thus, a bettor may place a bet, such as a bet regarding the spin of the reels of a slot machine, in which the inputs for the game are determined based on the value of financial market indicators rather than the numbers generated by a Random Number Generator. Another advantage is that when financial market indicators are unavailable, such as on the weekends and holidays when financial markets are typically closed, the system determines inputs for the game based on some other type of non-random but unpredictable event.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF EXAMPLE EMBODIMENTS OF THE INVENTION

Figure 1:
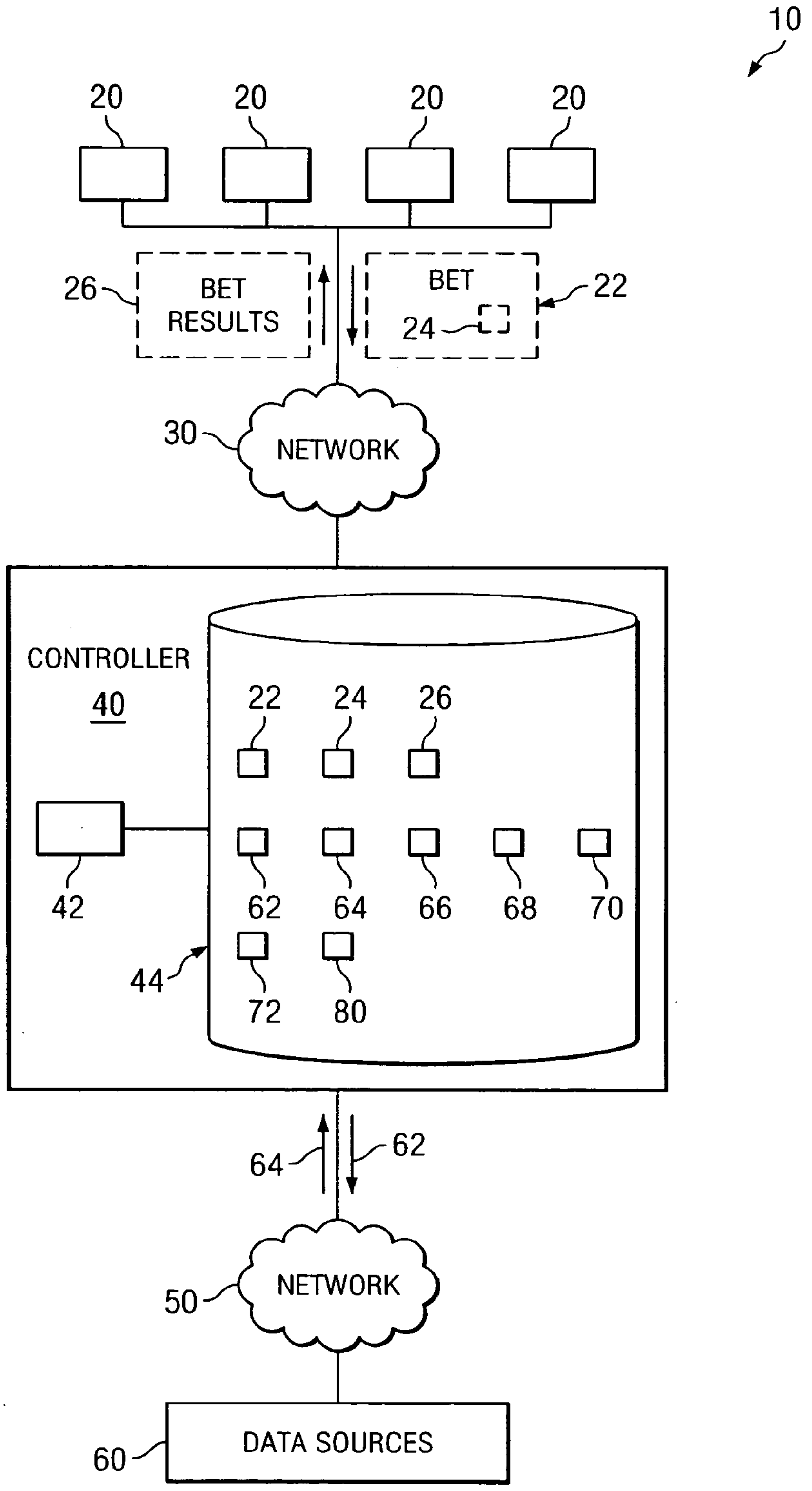
FIG. 1 illustrates an example system for wagering based on financial market indicators in accordance with an embodiment of the present invention.

FIG. 1 illustrates one embodiment of a system 10 that includes clients 20 coupled to a controller 40 using communication network 30. Controller 40 is further coupled to one or more data sources 60 using communication network 50. In general, system 10 provides for wagering based at least in part upon event information 64, such as financial market indicators.

Figure 2:
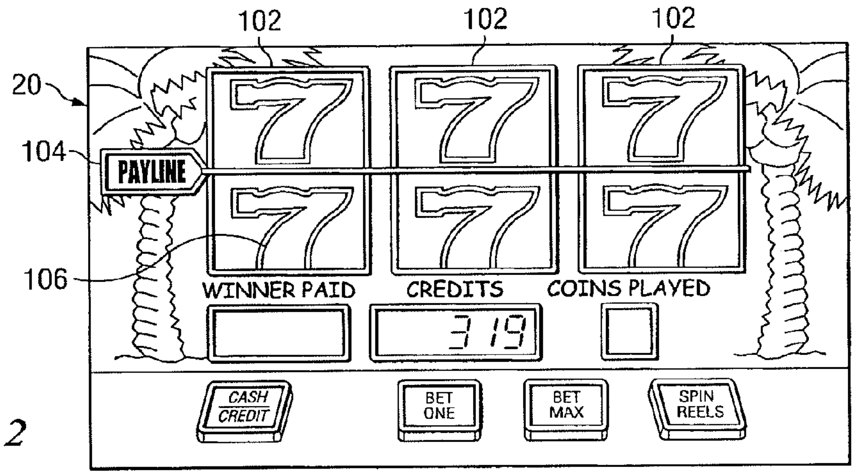
FIG. 2 illustrates one embodiment of a slot machine used with the system of FIG. 1.

Clients 20 are various users of system 10 that may place a bet 22 comprising bet parameters 24 and receive bet results 26. Clients 20 may also refer to the devices used by various users of system 10. Examples of these devices include a computer, a personal digital assistant, a mobile phone, a kiosk or point of sale terminal, or any other device that can interoperate with the elements of system 10 to perform the functions described herein. In a particular embodiment, clients 20 comprise physical slot machines. In other embodiments, clients 20 comprise devices, such as those described above, that can display a virtual slot machine to a user. FIG. 2 illustrates one example of such a slot machine 20.

Referring to FIG. 2, a slot machine 20, whether physical or virtual, includes any suitable number of reels 102, paylines 104, and symbols 106. Each reel 102 comprises a cylindrical spinning piece, or virtual display thereof, around which the symbols 106 are displayed. Each payline 104 comprises a line (e.g., horizontal, vertical, diagonal, or other) in the visible playing section of the slot machine 20. Each symbol 106 comprises a graphic, picture, image, or icon that is displayed on a reel 102. The symbols 106 may comprise, for example, blanks, cherries, bananas, oranges, diamonds, bells, lemons, numbers, bars, double bars, or any other recognizable images. The more reels 102 that are associated with the slot machine 20, the more permutations or possible combinations of symbols 106 are able to appear on the one or more paylines 104. The slot machine 20 illustrated in FIG. 2 is only one type of slot machine 20. The look and feel of slot machine 20 could change based on any number of factors associated with system 10, such as the type of data that is used to create the inputs for the slot machine 20. For example, if financial information 64 is used, then the look and of slot machine 20 feel (e.g., symbols 106, buttons, display, etc.) may be customized for financial markets.

Referring back to FIG. 1, communication networks 30 and 50 may comprise any suitable number and combination of local area networks, wide area networks (e.g., the Internet), wireless networks, or any other type of network that transfers data between controller 40 and the other elements of system 10, such as clients 20 and data sources 60. Although illustrated as two separate networks, all or a portion of networks 30 and 50 may be common to one another. Moreover, all or a portion of communication networks 30 and 50 may be a proprietary network. The transfer of data on network 30 may include the transfer of bets 22 and bet results 26. The transfer of data on network 50 may include a transfer of event data requests 62, such as financial market requests 62, and event information 64, such as financial market information 64.

Controller 40 comprises a processor 42 coupled to a memory 44. Processor 42 may comprise any suitable processor, such as a central processing unit (CPU) or other microprocessor, and may include any suitable number of processors working together. Memory 44 may comprise any suitable combination of volatile and non-volatile memory that stores bets 22, bet parameters 24, bet results 26, event data requests 62, event information 64, gaming rules 66, input values 68, input symbols 70, payouts 72, and wagering system software application 80. Processor 42 executes application 80 to process bets 22 based at least in part upon event information 64. Although the description detailed below discusses the controller 40 performing particular functions, it should be understood that some or all of the functions described as being performed by the controller 40 may be performed by clients 20.

Data sources 60 comprise any suitable source of real-time or substantially real-time event information 64. For example, data sources 60 may comprise a source of financial market information 64, such as market centers, market data vendors, news services, and the like. Financial market information 64 comprises information regarding the value of a financial market index or any other suitable financial instrument (e.g., stocks, bonds, futures contracts), referred to generally as a financial market indicator, during or at the end of a predetermined period of time or after one or more relevant transactions. For example, a financial market indicator may comprise the value of a certain financial market index, foreign or domestic, such as the Dow Jones Industrial Average (DJIA), the NASDAQ, the Financial Times Stock Exchange (FTSE), the S&P 500, the New York Stock Exchange, or any other suitable financial market index. In another example, the financial market indicator may comprise the value of a particular stock, bond, futures contract, or any other suitable financial instrument. The financial market indicator may be rounded, such as to the nearest whole point (e.g., a financial market indicator of 9,314.62 may be rounded up to 9,315), and/or include any suitable number of decimal places to provide an appropriate level of granularity. Therefore, each financial market indicator may comprise a plurality of numerical digits associated with the value of a corresponding financial market index or other financial instrument. As described in greater detail below, controller 40 may determine the outcome of bets 22 based at least in part upon the value of one or more digits that comprise a particular financial market indicator.

Although the description of system 10 is detailed with reference to financial markets, it should be understood that system 10 provides for the contingency whereby financial markets (and therefore financial market indicators) are unavailable at a given point in time. For example, financial markets may be closed at various times of the day, on weekends, or during holidays so that financial market indicators are unavailable at these times. In those instances, controller 40 uses event information 64 from other sources 60 to create inputs for the games, such as a slot machine game. The event information 64 may comprise any suitable numerical data that is not randomly generated but that is also not predictable. For example, the event information 64 may be related to the weather in one or more locations at a particular time; the U.S. national debt at a particular time; power consumption of a city at a particular time; the number of television shows tuned in to a particular channel or program at a particular time (e.g., television ratings); the power output of a facility at a particular time; horse race, dog race, jai alai, or other sporting event results at a particular time; or any other substantially changing numerical data that is related to non-random events.

In operation, controller 40 receives a bet 22 comprising bet parameters 24. In one embodiment, the bet 22 comprises a bet regarding a spin of the reels 102 of a slot machine 20. In another embodiment, the bet 22 comprises a bet regarding a "lottery" number. The bet parameters 24 comprise one or more of the identity of the client 20 that originated the bet 22; the amount of the bet 22; the time the bet 22 was placed; the type of bet 22 (e.g., slot machine bet, lottery bet, or other type bet); a period of time used to determine the appropriate financial market information 64; a particular digit of a financial market indicator (e.g., first digit, last digit, nth digit); and information that identifies one or more financial instruments used to determine the appropriate financial market information 64. In the embodiment where the type of bet 22 comprises a lottery bet 22, the bet parameters 24 may further include a multi-digit lottery number.

Controller 40 processes the bet 22 based at least in part upon financial market information 64. For example, suppose bet 22 specifies the DJIA, the S&P 500, and the NASDAQ, as financial market indices to be used to determine the outcome of bet 22. Suppose further that bet 22 specifies that the financial market indicators for these financial market indices should be captured ten seconds after the bet 22 is placed, as represented, for example, by a timestamp associated with bet 22 (other bets 22 could indicate that the financial market indicator that is used coincide in time with the timestamp communicated with the bet 22). In this example, controller 40 generates a financial market request 62 for the appropriate financial market information 64. In response to the financial market request 62, controller 40 receives the following financial market indicators representing the value of the DJIA, the S&P 500, and the NASDAQ ten seconds after the bet 22 was placed: DJIA—10,155; S&P 500—1112; and NASDAQ—1959. Suppose further that the bet parameters 24 of the bet 22 specified the use of the last digit of each of these financial market indicators to determine input values 68. Controller 40 therefore determines a first input value 68 of "5" (e.g., the last digit of the financial market indicator associated with the DJIA); a second input value 68 of "2" (e.g., the last digit of the financial market indicator associated with the S&P 500); and a third input value 68 of "9" (e.g., the last digit of the financial market indicator associated with the NASDAQ).

In other examples, the input values 68 may be determined based on other digits of a financial market indicator or by applying any suitable mathematical formula that uses one or more digits of one or more financial market indicators as operands. In still other examples, a second input value 68 may be based at least in part upon a second digit of a first financial market indicator (e.g., first input value 68 is the $n^{th}$ digit of DJIA and second input value 68 is the $m^{th}$ digit of DJIA).

Controller 40 determines the outcome of bet 22 based upon the first input value 68, the second input value 68, and the third input value 68. For example, suppose that bet 22 comprises a slot machine type bet 22. In this example, controller 40 maps the input values 68 to appropriate input symbols 70 for a slot machine 20, according to rules 66. In particular, controller 40 maps the first input value 68 to a first input symbol 70 for a first reel 102 of slot machine 20. Controller 40 maps the second input value 68 to a second input symbol 70 for a second reel 102 of slot machine 20. Controller 40 maps the third input value 68 to a third input symbol 70 for a third reel 102 of slot machine 20. The first reel 102, the second reel 102, and the third reel 102 may be arranged in any suitable order in the slot machine 20, so that the ordering of the financial market indicators when applied to the reels 102 of the slot machine 20 may comprise one of "529," "592," "259," "295," "952," or "925" based upon rules 66 or bet parameters 24.

Rules 66 specify a mapping of numeric digits to particular input symbols 70. For example, rules 66 may specify the following mapping:

"0"=Blank
"1"=Cherry
"2"=Banana
"3"=Orange
"4"=Diamond
"5"=Bell
"6"=Lemon
"7"=Seven
"8"=Bar
"9"=Double Bar Of course, controller 40 may use any suitable mapping of numeric digits to input symbols 70, and the mapping provided above is only an example of one such mapping. Moreover, particular embodiments of system 10 use bonus symbols 70 to create a jackpot. For example, from time to time, any of the numeric digits from "0" to "9" could result in a bonus symbol 70, such as a "$," "+," "#," "£," "¥," etc. If one or more of the reels 102 results in a bonus symbol 70, then the user wins an enhanced payout 72. For example, if one reel 102 results in a bonus symbol 70, the user may win a higher payout 72 than normal. If two reels 102 result in a bonus symbol 70, the user may win a still higher payout 72. If all three reels 102 result in a bonus symbol 70, the user may win a jackpot payout 72. The occurrence of a bonus symbol 70 for any given reel 102 could be based upon predetermined odds. For example, the odds of receiving a bonus symbol 70 for any given reel 102 may be 100-1. The odds of receiving a bonus symbol 70 for two reels 102 would therefore be 1000-1. The odd of receiving a bonus symbol 70 for all three reels 102 would therefore be 1,000,000-1. The payouts 72 for each of these results could then be predicated upon the predetermined odds, taking into account a predetermined house advantage.

Using the mapping set forth above, controller 40 therefore determines that the spin of the reels 102 of slot machine 20 associated with bet 22 resulted in a combination of "Bell," "Banana," and "Double Bar" at the payline 104. Controller 40 applies rules 66 to determine bet results 26. That is, controller 40 applies rules 66 to determine whether this combination of symbols 70 results in a "win," a "loss," or a "tie". Controller 40 also applies rules 66 to determine a payout 72 based upon the resulting combination of symbols 70 and the amount of the bet 22. In this regard, rules 66 include the winning combinations of symbols 70, the payout odds associated therewith, and any other factors used to determine a bet result 26 and/or a payout 72. Controller 40 communicates bet results 26 and any other data used to display the appropriate symbols 70 on the reels 102 of slot machine 20.

Controller 40 may also determine the outcome of bet 22 based upon the first input value 68, the second input value 68, and third input value 68 if bet 22 comprises a lottery type bet 22. In this example, suppose the bet parameters 24 specified a multi-digit lottery number of "529" and specified that this number was to be formed using the last digit of the DJIA, S&P 500, and NASDAQ, in that order, ten seconds after the bet 22 was placed. Based upon the financial market indicators described above, controller 40 determines a winning number of "529." In other examples, the winning number may be determined by applying any suitable mathematical formula that uses one or more determined input values 68 (or financial market indicators) as the operands.

Controller 40 compares the multi-digit lottery number of "529" specified by the bet parameters 24 with the winning number "529" determined according to financial market information 64 to determine the outcome of lottery type bet 22. In this example, controller 40 determines that bet 22 "wins." Controller 40 determines an appropriate payout 72 for the winning bet 22 based at least in part upon the amount of the bet 22 and/or the payout odds associated with such a bet 22 as specified by rules 66. For example, with respect to a three-digit lottery type bet 22, rules 66 may specify payout odds of 500-1. Therefore, if the amount of the bet 22 was $1, then the payout 72 would comprise $500.00.

Figure 3:
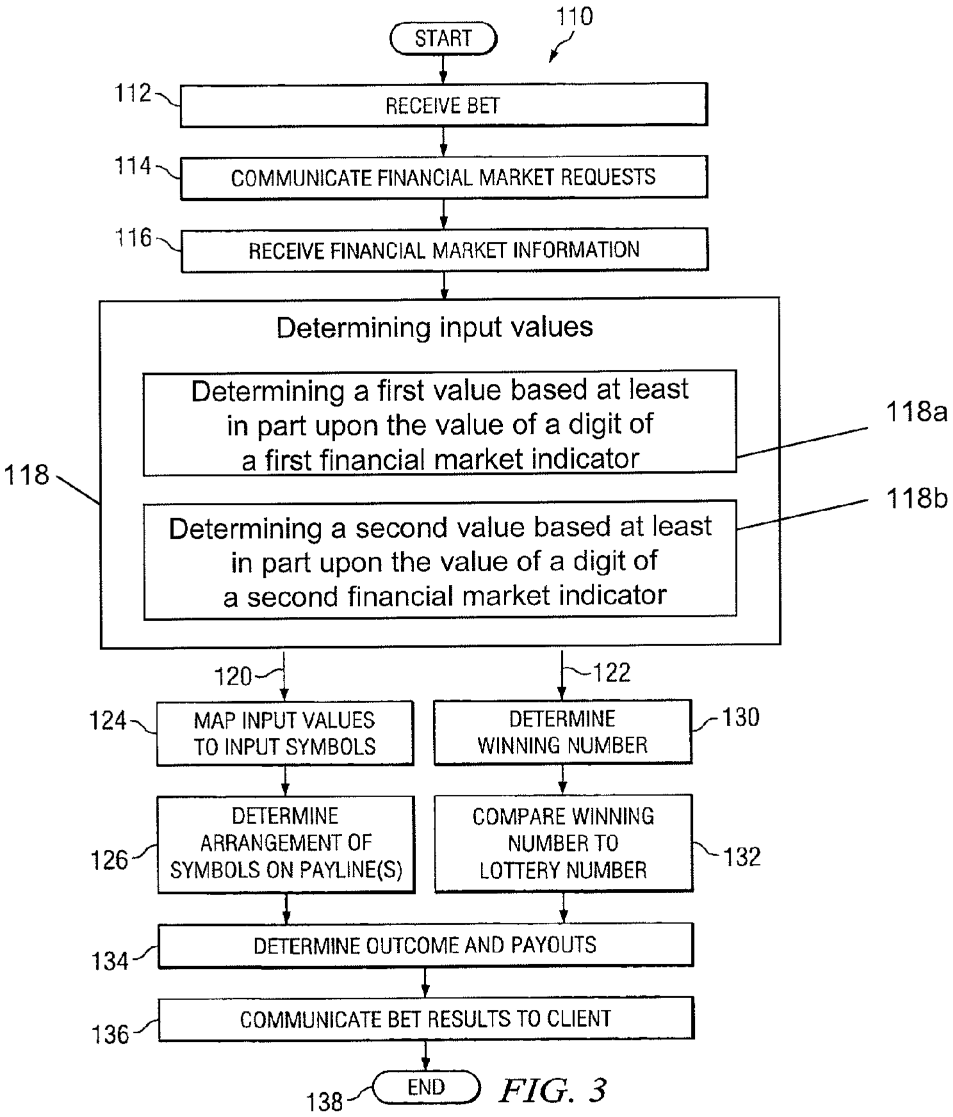
FIG. 3 illustrates a flowchart depicting one example method for wagering based on financial market indicators.

FIG. 3 illustrates a flowchart 110 depicting one example method for wagering based on financial market indicators. At step 112, controller 40 receives a bet 22 from a client 20. The bet 22 may specify particular financial instruments and a predetermined period of time to be used to determine one or more financial market indicators. For example, the bet 22 may specify to capture financial market indicators for the DJIA, the S&P 500, and the NASDAQ ten seconds after the bet 22 is placed. Bet 22 may further specify additional bet parameters 24. Controller 40 communicates appropriate financial market requests 62 at step 114 and receives appropriate financial market information 64 at step 116. In other embodiments, controller 40 may simply capture the appropriate financial market information 64 without issuing any requests 62. In still other embodiments when financial market indicators are unavailable, controller 40 captures other event information 64 for use in later steps of the method.

Execution proceeds to step 118 where controller 40 determines the input values 68 based upon the financial market information 64 received at step 116. Controller 40 may determine any suitable number of input values 68 from any suitable number and combination of financial market indicators using any suitable techniques described in greater detail above with regard to FIG. 1. From here, execution proceeds along path 120 if the bet 22 is a slot machine type bet 22, and along path 122 if the bet 22 is a lottery type bet 22.

Proceeding along path 120, controller 40 maps input values 68 determined at step 118 to input symbols 70 at step 124. Controller 40 determines the arrangement of input symbols 70 on the one or more paylines 104 of the slot machine 20 at step 126. This arrangement may be based at least in part upon bet parameters 24. For example, the bet parameters 24 may dictate that the financial market indicators for the DJIA, the S&P 500, and the NASDAQ should be used in that specific order.

Proceeding along path 122, controller 40 determines the winning number, at step 130, based at least in part upon the input values 68 determined at step 118. Controller 40 compares the winning number determined at step 130 to the lottery number specified by the bet 22, at step 132.

Whether execution proceeded along path 120 or path 122, execution now proceeds to step 134 where controller 40 determines one or more outcomes of the bet 22 and payouts 72. Controller 40 communicates bet results 136 to client 20 at step 136. Execution terminates at step 138.

It should be understood that in alternative embodiments, the present invention contemplates using methods with additional steps, fewer steps, different steps, or steps in different sequential order so long as the steps remain appropriate for wagering based on financial market indicators.

Although embodiments of the invention and their advantages are described in detail, a person skilled in the art could make various alterations, additions, and omissions without departing from the spirit and scope of the present invention as defined by the appended claims.

What is claimed is:

1. A method comprising:

receiving, by a computing device, a bet on a multi-reel slot game, wherein the computing device comprises a processor configured to execute program instructions stored in memory, a display device configured to display slot game reels, and at least one input device configured to accept the multi-reel slot game bet in response to an input by a player, the bet being associated with a time; and wherein the program instructions are executed for:

determining, by the computing device, a first value based at least in part upon the value of a digit of a first financial market indicator, in which the value of the digit includes the value of the digit that occurs at the moment when an amount of time has passed after the time associated with the bet, in which the amount of time was determined before the bet was received;

determining, by the computing device, a second value based at least in part upon the value of a digit of a second financial market indicator;

controlling, by the computing device, a first reel of the multi-reel slot game to display the first value on the display device;

controlling, by the computing device, a second reel of the multi-reel slot game to display the second value on the display device; and determining, by the computing device, whether the bet is a winning bet based on the first value and the second value.

2. The method of claim 1, further comprising determining a third value based at least in part upon the value of a third financial market indicator, wherein determining the winning number is further based upon the third value.

3. The method of claim 1, wherein the first value and the second value are arranged in an order in the multi-reel slot game.

4. The method of claim 1, wherein the first financial market indicator comprises a plurality of numerical digits, and the first value is based at least in part upon the value of the last digit of the plurality of digits.

5. The method of claim 1, wherein the first financial market indicator comprises a plurality of numerical digits, and the first value is based at least in part upon a formula using at least one of the plurality of digits.

6. The method of claim 1, wherein the digit of the first financial market indicator is includes a single digit that is identified by the bet.

7. The method of claim 1, wherein the first financial market indicator is associated with at least one of: an index of financial instruments, an index of stocks, an index of U.S. securities, an Index of international securities, an index of financial instruments related to companies that have a large capitalization, and an index of financial instruments that relate to technology companies.

8. The method of claim 1, wherein the time includes a time when the bet is placed, and the amount of time includes an amount of time after the bet is placed.

9. The method of claim 8, wherein the bet identifies the time.

10. The method of claim 1, wherein the bet identifies a source of the first financial market indicator.

11. The method of claim 1, further comprising:

mapping the first value to a first symbol for the first reel of the multi-reel slot machine;

mapping the second value to a second symbol for the second reel of the multi-reel slot machine; and in which determining whether the bet is a winning bet based on the first and second values includes determining whether the bet is the winning bet based on the first symbol and second symbol.

12. The method of claim 1, wherein the time includes a time when the bet is received, and the amount of time includes an amount of time after the bet is received.

13. The method of claim 1, wherein the bet identifies the amount of time.

14. The method of claim 1, in which the amount of time includes 10 seconds.

15. The method of claim 1, wherein the first value and the second value are arranged in an order identified by placement of the bet.

16. The method of claim 1, wherein the first value of the first financial market indicator includes a least significant digit of the first financial market indicator.

17. The method of claim 1, comprising determining the amount of time before receiving the bet.

18. An apparatus comprising:

a computing device comprising a processor, a display device configured to display slot game reels, and at least one input device configured to receive a bet input by a player;

a non-transitory medium having stored thereon a plurality of instructions that when executed by the computing device cause the computing device to:

receive, by the input device, a bet on a multi-reel slot game, the bet being associated with a time;

determine a first value based at least in part upon the value of a digit of a first financial market indicator, in which the value of the digit includes the value of the digit that occurs at the moment when an amount of time has passed after the time associated with the bet, in which the amount of time was determined before the bet was received;

determine a second value based at least in part upon the value of a digit of a second financial market indicator;

control a first reel of the multi-reel slot game to display the first value on the display device;

control a second reel of the multi-reel slot game to display the second value on the display device;

determine whether the bet is a winning bet based on the first value and the second value.

* * * * *